United States Patent [19]
Allpress et al.

[11] Patent Number: 5,920,552
[45] Date of Patent: Jul. 6, 1999

[54] VARIABLE RATE CODING FOR WIRELESS APPLICATIONS

[75] Inventors: Stephen Alan Allpress, Randolph; Christopher Nicholas Malvone, South Plainfield; Francis Edward O'Brien, Wharton; Lawrence Howard Ozarow, Maplewood, all of N.J.

[73] Assignee: Lucent Technologies, Inc., Murray Hill, N.J.

[21] Appl. No.: 08/656,119

[22] Filed: May 30, 1996

[51] Int. Cl.[6] .............................. H04J 3/16; H04B 7/216
[52] U.S. Cl. ...................... 370/335; 370/441; 370/468; 370/209
[58] Field of Search ..................................... 370/209, 320, 370/328, 335, 441, 468, 342; 375/205, 341

[56] References Cited

U.S. PATENT DOCUMENTS

| | | | |
|---|---|---|---|
| 5,541,955 | 7/1996 | Jacobsmeyer | 375/222 |
| 5,568,483 | 10/1996 | Padovani et al. | 370/468 |
| 5,581,575 | 12/1996 | Zehavi et al. | 375/200 |
| 5,623,485 | 4/1997 | Bi | 370/209 |
| 5,671,255 | 9/1997 | Wang et al. | 375/341 |

*Primary Examiner*—Min Jung
*Attorney, Agent, or Firm*—Christopher N. Malvone

[57] ABSTRACT

A flexible communications systems provides users with additional communication channels without requiring additional transmitters or receivers by using variable rate Walsh coding. Additionally, the assignment of these additional communication channels is easily managed at the base station by monitoring data backlog and receiver error rates.

10 Claims, 4 Drawing Sheets

$$W_1 = [+1]$$

$$W_2 = \begin{bmatrix} +1 & +1 \\ +1 & -1 \end{bmatrix}$$

$$W_{2n} = \begin{bmatrix} W_n & W_n \\ W_n & \overline{W_n} \end{bmatrix}$$

$$W_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

VARIABLE RATE CODING FOR WIRELESS APPLICATIONS

FIELD OF THE INVENTION

The present invention relates to wireless communications; more specifically, to variable transmission rates in a wireless communications system.

DESCRIPTION OF THE PRIOR ART

In the past, wireless communications supported a single communication channel per user. This limited the flexibility of the telecommunication system with regard to the high data rate required in applications such as multimedia applications. As a result, separate transmitters and receivers were used for each communication channel and thereby created an expensive and complicated communication system.

SUMMARY OF THE INVENTION

An embodiment of the present invention addresses the aforementioned problem by providing users with additional communication channels without requiring additional transmitters or receivers. The additional channels are provided by using variable rate coding, such as variable rate Walsh coding. Additionally, the assignment of these additional communication channels is easily managed at the base station by monitoring data backlog and receiver error rates.

DETAILED DESCRIPTION OF THE INVENTION

Figure 1:
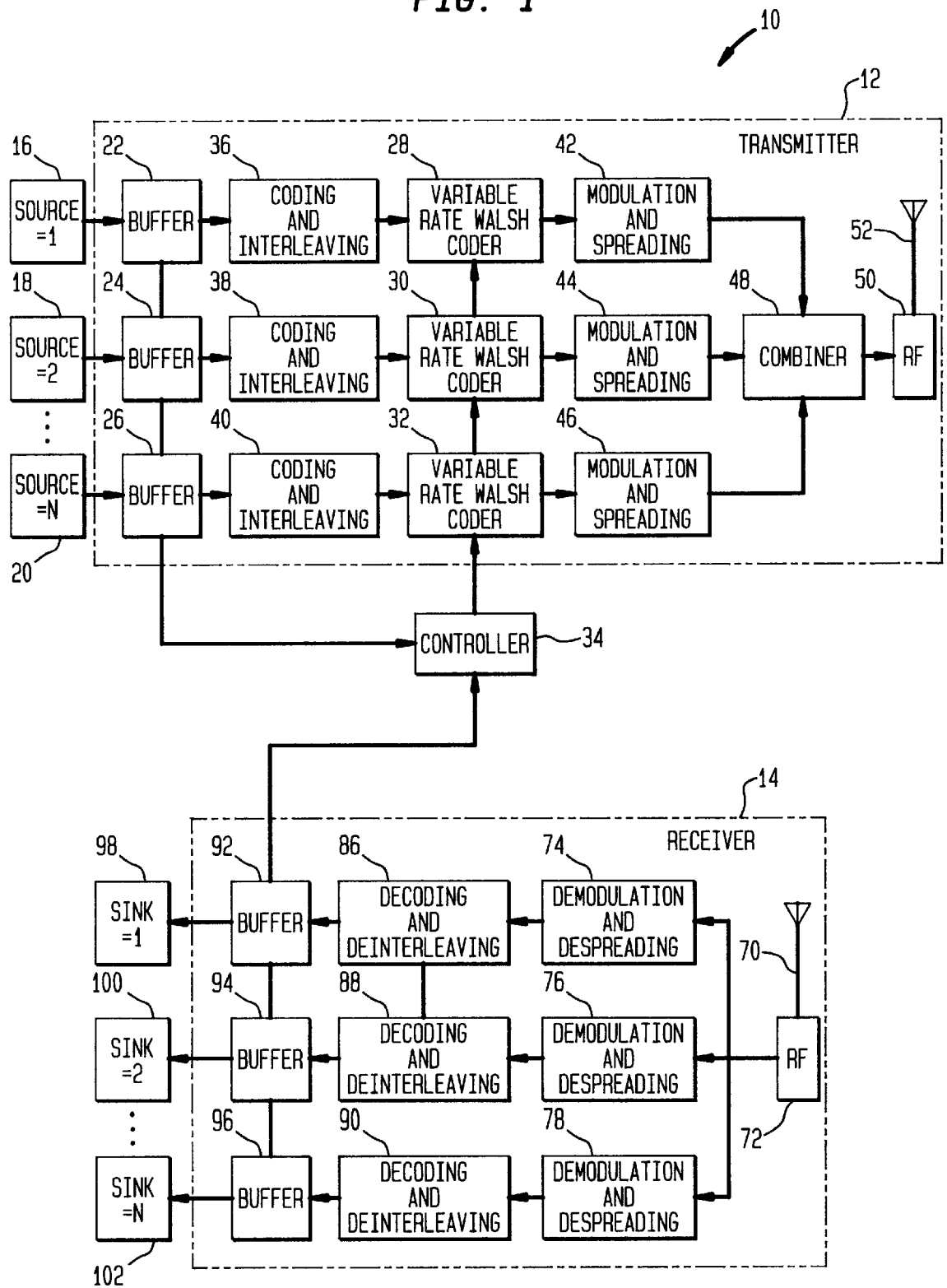
FIG. 1 illustrates a wireless base station embodying the present invention.

FIG. 1 is a block diagram of wireless base station 10. Base station 10 includes transmitter 12 and receiver 14. Transmitter 12 receives data from sources 16, 18, and 20. The data from sources 16, 18, and 20 arrives at different rates and may be in bursts. Transmitter 12 receives this data and transmits it to the appropriate user. The data from sources 16, 18, and 20 is received by elastic buffers 22, 24, and 26, respectively. The elastic buffers permit data to be received at one rate and removed from the buffer at a different rate. Such a buffer may be implemented using a device such as a FIFO. The outputs from buffers 22, 24, and 26 are passed to coding and interleaving circuits 36, 38, and 40, respectively. These coding circuits perform coding functions such as forward error correction (FEC). They also perform interleaving functions such as block interleaving or convolutional interleaving. Other types of coding and interleaving may be performed by these circuits. In any case, coding and interleaving is well known in the art.

The outputs of coding interleaving circuits 36, 38, and 40 are received by variable rate Walsh coders 28, 30, and 32, respectively. The Walsh coders are controlled by controller 34. Controller 34 monitors the condition of buffers 22, 24, and 26 to determine if an overflow situation is about to occur. If an overflow situation is about to occur, controller 34 instructs the appropriate variable rate Walsh coder to increase the coding rate or number of channels for that particular buffer. As a result, data is transferred more quickly to alleviate the overflow condition. Additionally, controller 34 monitors the buffers to determine if there is very little data backlogged in them. If little data is contained in the buffers, controller 34 instructs the appropriate variable rate Walsh coder to decrease the coding rate or number of channels provided to the buffer so as to free up additional channels for other users. Controller 34 may be implemented using devices such as a microprocessor or a microcomputer.

The outputs of variable rate Walsh coders 28, 30, and 32 are received by modulation and spreading circuits 42, 44, and 46, respectively. Modulation and spreading circuits are well known in the art. Modulation such as QPSK, OQPSK (offset QPSK), or orthogonal modulation may be implemented by circuits 42, 44, and 46. The spreading function is carried out using a PN (pseudo noise) sequence. The outputs of the modulation and spreading circuits are received by combiner 48. Combiner 48 sums the outputs from circuits 42, 44, and 46 and is well known in the art. It should be noted that the addition may be a complex addition. The output of combiner 48 is received by RF circuitry 50 which is well known in the art, and then the output of RF circuitry 50 is transmitted via antenna 52.

Receiver 14 of base station 10 receives transmissions from mobile units via antenna 70. Antenna 70 passes the signals to RF interface 72 which then provides inputs to demodulation and deinterleaving circuits 74, 76, and 78. RF interface 72 and demodulation and deinterleaving circuits 74, 76, and 78 are well known in the art. The outputs of demodulation and deinterleaving circuits 74, 76, and 78 are received by buffers 92, 94, and 96, respectively. The buffers may be elastic buffers implemented using FIFOs. The outputs of buffers 92, 94, and 96 are sent to data destinations 98, 100, and 102, respectively. The outputs from buffers 92, 94, and 96 are monitored by controller 34. Some of the data that is monitored by controller 34 includes error data being transmitted by the users. Controller 34 uses this data to determine whether the present transmission rates provided to a user are producing acceptable error rates. If the error rates are high, the transmission rates are lowered.

The data sources and data destinations may be parts of another communication system such as the public switched telephone network or a cable television network. It should also be noted that the transmitter and receiver are described as having three basic data paths. It should be noted that this was done for instructional purposes, and that more or less paths may be provided.

Figure 2:
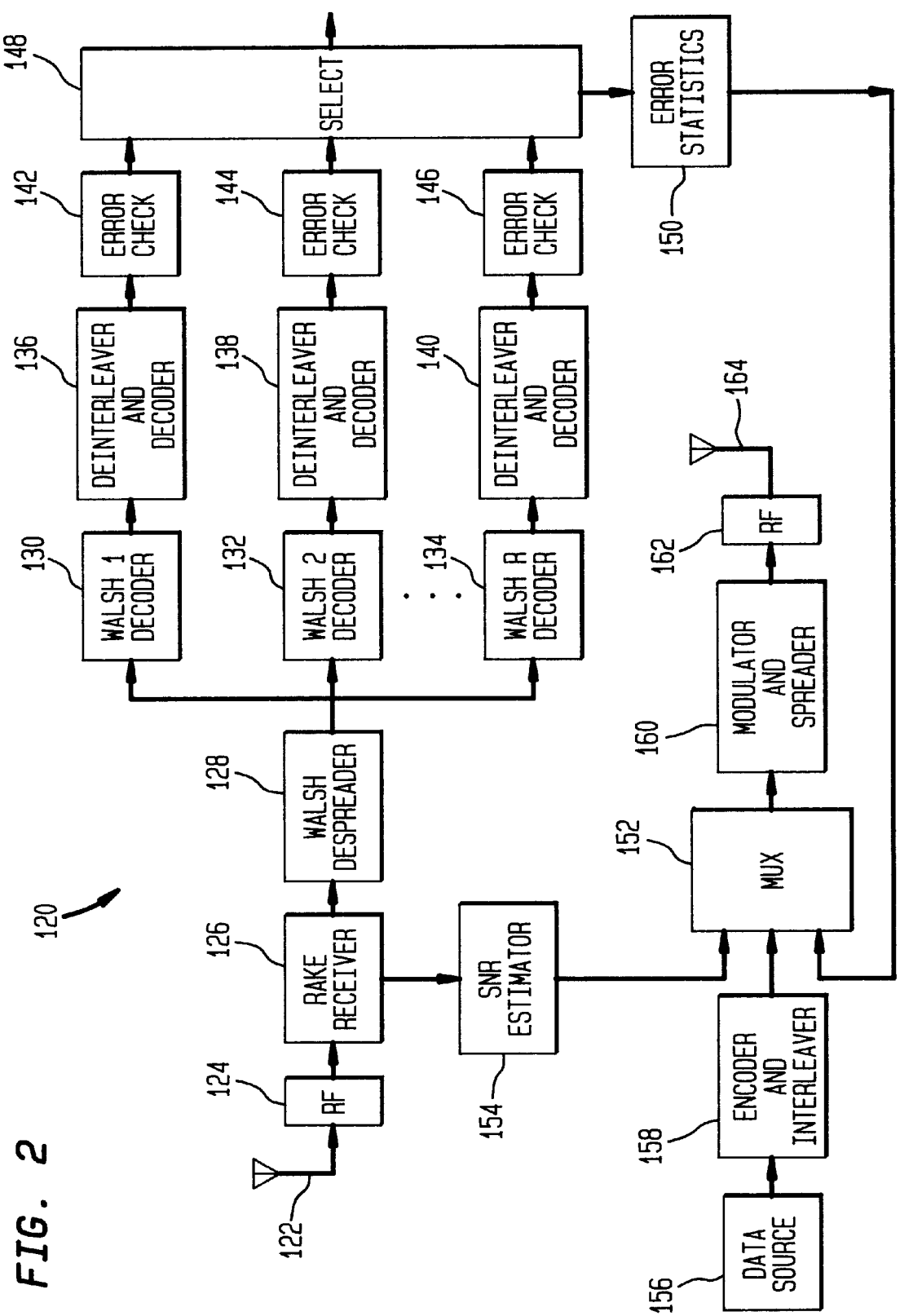
FIG. 2 illustrates a receiver structured to receive the variable transmission rates.

FIG. 2 illustrates a block diagram of a user's receiver 120 that receives transmissions from, and transmits data to base station 10. User receiver 120 receives data on antenna 122 and then passes the signal from antenna 122 to RF circuitry 124. The output from RF circuitry 124 is passed to RAKE receiver 126. RAKE receiver 126 performs functions such as demodulation and deinterleaving. RF circuitry 124 and RAKE receiver 126 are well known in the art. The output of RAKE receiver 126 is provided to Walsh despreader 128. Walsh despreader 128 provides an input to Walsh decoders 130, 132, and 134. Walsh decoders 130, 132, and 134 provide inputs to deinterleaver and decoders 136, 138, and 140, respectively. Deinterleavers and decoders are well known in the art. The output of deinterleaver and decoders 136, 138, and 140 are provided to error check units 142, 144, and 146. The error check units perform frame error checking using cyclic redundancy check codes (CRC) or parity check. The outputs of the error check units are received by selection unit 148. Selection unit 148 selects the frame produced at the output of the error check unit that does not have an error associated with the frame. Selection unit 148 then passes the frame on to other parts of receiver 120 for processing display or other uses.

It should be noted that each data path through receiver 120 is associated with a different coding rate. For example, Walsh decoder 130 decodes a data stream that has been encoded with the maximum Walsh rate. Walsh decoder 132 decodes data that has been encoded at one-half the maximum Walsh data rate, and Walsh decoder 134 is decoding data that has been encoded at the maximum Walsh coding rate divided by R, where R is the maximum expected multiple of a base rate B. For example, R may equal 4 and B may equal 9600 bits per second. It should be noted that a different data path is provided for each coding rate that might have to be decoded. For illustrative purposes, only three have been shown, but it is possible to have more or less.

The output of each decoding path is monitored by the error check unit associated with that path. Depending on the rate in which the data was originally encoded by the transmitter, only one of the decoding paths will produce an error free frame. As a result, receiver 120 does not have to know a priori what the rating code was; it simply decodes for all of the available rates and picks the output that does not have an error.

Error statistics unit 150 collects error data from selection unit 148. The error data may include information such as when all error check units detected errors or how many consecutive frames were received with errors. This information is passed to multiplexer 152 for eventual transmission to base station 10. Additional information for transmission to base station 10 is received by signal to noise ratio estimator 154. Estimator 154 uses information such as signal strength from RAKE receiver 126 to estimate the mean and variance of the signal to noise ratio at the receiver. This information is passed to multiplexer 152 for transmission to base station 10. Additionally, unit 120 may include a data source 156 which produces data for transmission to base station 10. The data from source 156 is provided to interleaver and encoder 158 which is well known in the art. The output of interleaver and encoder 158 is also provided to multiplexer 152. The output of multiplexer 152 is provided to modulator and spreader 160 which then provides its output to RF circuitry 162. The signal from RF circuitry 162 is provided to antenna 164 for transmission to base station 10. Interleaver and encoder 158, modulator and spreader 160, and RF circuitry 162 are all well known in the art.

Figures 3, 4, 5:
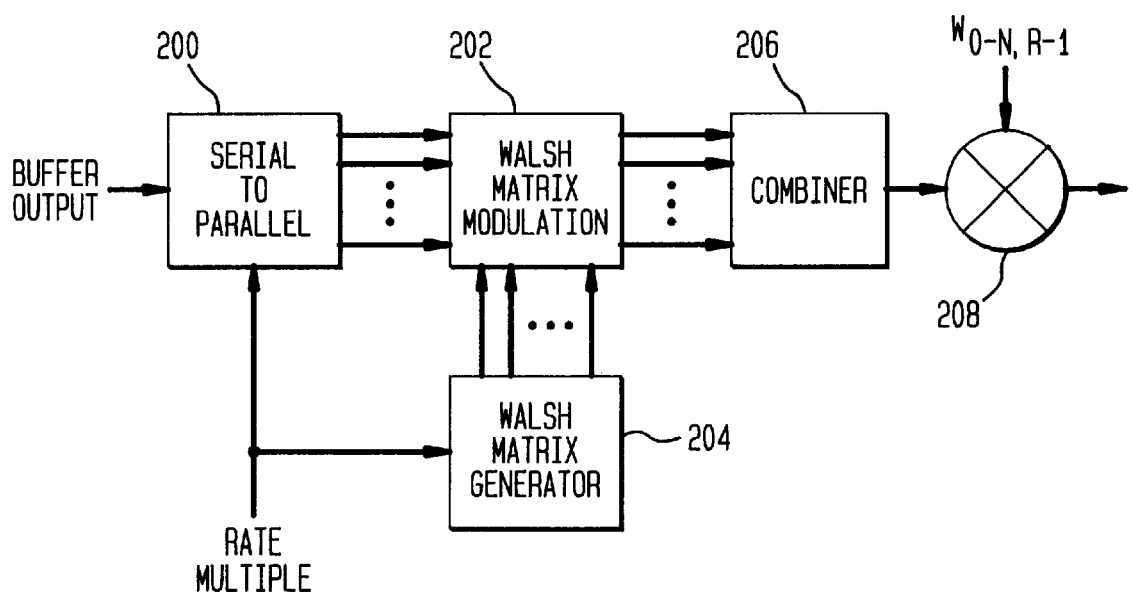
FIG. 3 illustrates Walsh matrices.
FIG. 4 illustrates a Walsh matrix of order 4.
FIG. 5 illustrates a variable rate Walsh coder.

FIG. 3 illustrates a Walsh matrix of order 1 and order 2, and a Walsh matrix of order 2n. The relationship between a Walsh matrix of order n and order 2n is a recursive relationship and is used to easily produce larger order Walsh matrices. For example, in creating a Walsh matrix of order 4, the Walsh matrix of order 2 is inserted into the upper left hand corner, the upper right hand corner, and the lower left hand corner of the Walsh matrix of order 4. The bar version of the Walsh matrix of order 2 is inserted into the lower right hand corner of the Walsh matrix of order 4. The bar version of the matrix is formed by taking the logical inverse of each element of the matrix. FIG. 4 illustrates a Walsh matrix of order 4.

FIG. 5 illustrates a block diagram of a variable rate Walsh coder. The data from a buffer is received by serial to parallel converter 200. Serial to parallel converter 200 converts data received at basic rate B into M serial data streams of rate B divided by M. The M data streams from serial to parallel converter 200 are used to modulate Walsh matrix 202. The Walsh matrix in unit 202 is of size M by M and is generated by Walsh matrix generator 204 using the recursive relationship between the Walsh matrices. Controller 34 provides serial to parallel converter 200 and Walsh matrix generator 204 with the value M. The output of Walsh matrix unit 202 is M parallel Walsh encoded data streams that are combined in combiner 206 which adds the data streams on a Walsh chip by Walsh chip basis. A Walsh chip can be thought of as an individual element of a Walsh sequence. The output of combiner 206 is provided to spreader 208 which multiplies the combined data stream with a Walsh sequence that has been assigned to the particular user that is to receive the data. The number of Walsh sequences available for assignment to users is N divided by M, where N is the total number of Walsh sequences assigned to a particular base station and M is the number of channels assigned to a user, i.e., the number of data streams from serial to parallel converter 200 being received by Walsh matrix unit 202.

Figure 6:
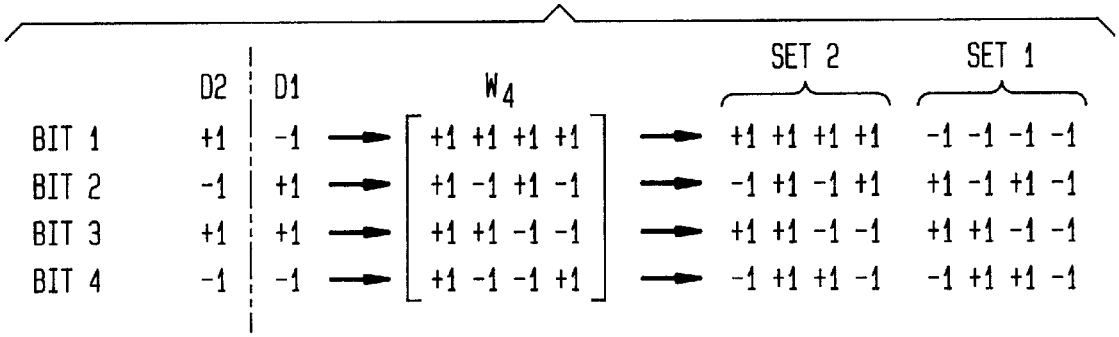
FIG. 6 illustrates modulating a Walsh matrix with data.

FIG. 6 illustrates the way in which data from serial to parallel converter 200 modulates the Walsh matrix in Walsh matrix unit 202. Parallel data words D1 and D2 are used to modulate Walsh matrix $W_4$. Each data word produces four data streams each containing four chips. Data word D1 produces chip set 1 and data word D2 produces chip set 2. It should be noted that bit 1 of data word 1 modulated the first row of Walsh matrix $W_4$ by inverting each of the entries on that row. Each entry was inverted because bit 1 of data word 1 was −1. As a result, the four chips produced by bit 1 of data word 1 were all −1. In a similar fashion, bit 2 of data word 1 modulated row 2 of Walsh matrix 4. Since bit 2 was a +1, the entries in row 2 were not inverted and therefore produced the four chips shown in the second row of chip set 1. It should be noted that these operations are performed in parallel; that is, each bit in data word 1 modulates each row of Walsh matrix 4 in parallel to produce the four rows of chip set 1 in parallel. After being modulated by data word 1, Walsh matrix 4 is then modulated by data word 2. This process continues for each output from serial to parallel converter 200.

The size of the Walsh matrix used by the variable rate Walsh coder and the number of outputs provided by serial to parallel converter 200 is changed by controller 34 when it specifies the value M to the variable rate Walsh coder. This value will change based on the data backlogged in the buffers feeding the variable rate coder, and on the error rates being reported by units 120. Walsh matrix unit 202, Walsh matrix generator 204, combiner 206, and spreader 208, may be implemented using an appropriately programmed digital processor. A preferred embodiment of this invention would use a Fast Hadamard Transform (FHT) to perform the functions of units 202, 204, and 206.

Figure 7:
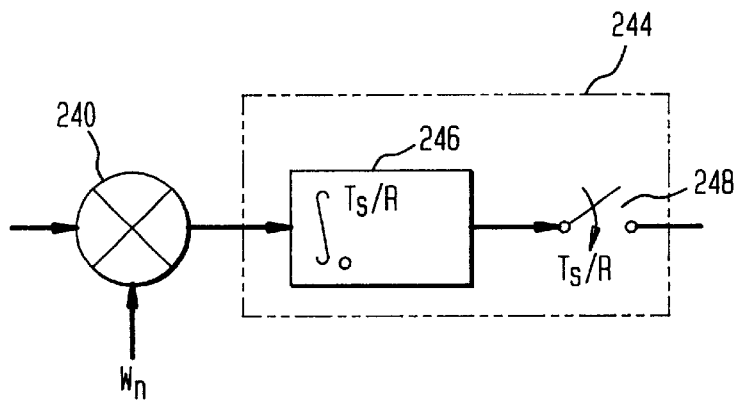
FIG. 7 illustrates a despreader.

FIG. 7 illustrates the functions performed by despreader 128 in receiver unit 120. Despreader 128 receives an input from RAKE receiver 126 and then despreads that input with multiplier 240 using the Walsh sequence assigned to unit 120. The output of multiplier 240 is provided to integrator and dump circuit 244. Integrator 246 simply integrates the signal from multiplier 240 for a period of time equal to T divided by R. T is the duration of a Walsh sequence. The Walsh sequence duration is the amount of time required to transmit or receive an entire Walsh sequence assigned to unit 120. Base station 10 assigns a different Walsh sequence to each receive unit 120 in order to provide selection between users. For example, T may be on the order of 52 μsec. R is the maximum multiple of the basic rate B that can be expected. At the end of the time period, T divided by R, the output of integrator 246 is sampled using sample and hold circuit 248. Integrators, and sample and hold circuits are well known in the art.

Figure 8:
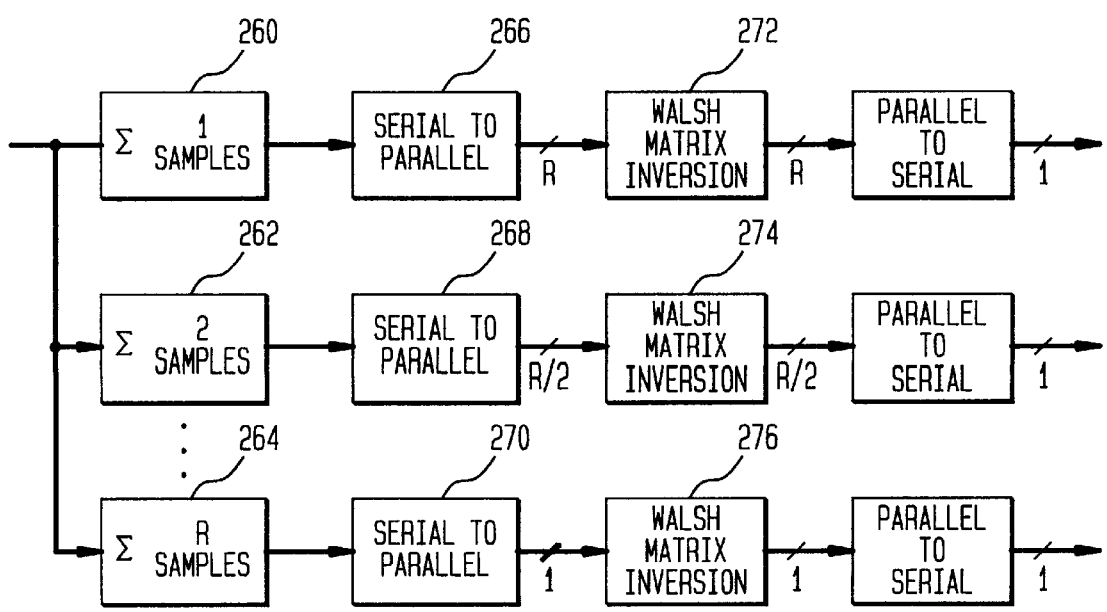
FIG. 8 illustrates a Walsh decoder.

FIG. 8 illustrates Walsh decoders 130, 132, and 134. The output from sample and hold circuit 248 is received by summers 260, 262, and 264. Summer 260 creates a sum over one sample from sample and hold circuit 248. Summer 262 creates a sum over two samples from sample and hold circuit 248. Summer 264 sums over R samples from sample and hold circuit 248. The output of summers 260, 262, and 264 are received by serial to parallel converters 266, 268, and 270. Serial to parallel converter 266 produces R parallel outputs that are received by Walsh matrix inversion unit 272. Walsh matrix inversion unit 272 performs the inverse process of an R by R Walsh encoding matrix and then recovers the originally encoded data sequence. A preferred embodiment would use an R-point Fast Hadamard Transform (FHT) to perform this function. An R-point FHT is well known in the art. The decoded data sequence is then provided to a deinterleaver and decoding unit. The output of serial to parallel converter 268 consists of R/2 parallel data streams which are provided to Walsh matrix inversion unit 274. Walsh matrix inversion unit 274 performs the inverse process of an R/2 by R/2 Walsh encoding matrix in a fashion similar to unit 272. The output of Walsh matrix inversion unit 274 is provided to a deinterleaver and decoding unit. The output of serial to parallel converter 270 is simply a single data stream that is provided to Walsh matrix conversion unit 276 which is a one-by-one matrix. (In this trivial case, the Walsh conversion matrix is simply a 1.) The output of Walsh conversion matrix 276 is also provided to a deinterleaver and decoding unit.

It should be noted that a Walsh decoder is provided for each of the possible data rates. Walsh decoder 130 which is associated with summer 260, serial to parallel converter 266, and Walsh matrix inversion unit 272 decodes the highest data rate expected. Each of the other Walsh decoders decode slower data rates which are typically the maximum rate divided by some power of 2. In this case, the slowest data rate is the maximum rate divided by R, where R is the maximum expected multiple of the base rate B. It should be noted that the Walsh decoders may be implemented using a single DSP or several DSPs.

The invention claimed is:

1. A method for providing variable rate wireless communications, comprising the steps of:
   monitoring a data backlog of data to be transmitted;
   increasing the data transmission rate by increasing a coding rate when the data backlog crosses a first threshold; and
   decreasing the data transmission rate by decreasing the coding rate when the data backlog crosses a second threshold.

2. The method of claim 1, wherein the steps of increasing and decreasing the coding rate comprise changing a Walsh coding rate.

3. A method for providing variable rate wireless communications, comprising the steps of:
   monitoring a data backlog of data to be transmitted;
   encoding data for transmission using a first Walsh matrix;
   changing a data transmission rate by changing a number of code division multiplexed channels when the data backlog crosses a first threshold.

4. The method of claim 3, wherein the step of changing the data transmission rate, comprises:
   increasing the data transmission rate by providing an additional code division multiplexed channel when the data backlog crosses the first threshold; and
   decreasing the data transmission rate by removing a code division multiplexed channel when the data backlog crosses a second threshold.

5. The method of claim 4, wherein the step of increasing the data transmission rate comprises encoding data for transmission using a second Walsh matrix, the second Walsh matrix being a higher order Walsh matrix than the first Walsh matrix, and the step of decreasing the data transmission rate comprises encoding data for transmission using a third Walsh matrix, the third Walsh matrix being a lower order Walsh matrix than the first Walsh matrix.

6. A method for providing variable rate wireless communications, comprising the steps of:
   monitoring a data backlog of data to be transmitted in a buffer associated with a particular receiver in a wireless communications system;
   performing a parallel to serial conversion on data received from the buffer to produce M data streams, where M is an integer;
   encoding the M data streams using a M by M Walsh matrix to produce M Walsh encoded data streams;
   combining the M Walsh encoded data streams to produce a combined data stream;
   changing M when the data backlog crosses a first threshold; and
   transmitting the combined data stream to the particular receiver using a communication channel assigned to the particular receiver.

7. The method of claim 6, wherein the step of changing M, comprises:
   increasing M when the data backlog crosses the first threshold; and
   decreasing M when the data backlog crosses a second threshold.

8. The method of claim 7, wherein the step of transmitting comprises transmitting to the particular receiver using a code division multiple access channel.

9. A method for providing variable rate wireless communications, comprising the steps of:
   monitoring a data backlog of data to be transmitted in a buffer assigned to a particular receiver in a wireless communications system;
   performing a parallel to serial conversion on data received from the buffer to produce M data streams, where M is an integer;
   encoding the M data streams using a M by M Walsh matrix to produce M Walsh encoded data streams;
   combining the M Walsh encoded data streams to produce a combined data stream;
   changing M when the data backlog crosses a first threshold;
   transmitting the combined data stream to the particular receiver using a communication channel assigned to the particular receiver;
   receiving the combined data stream at the particular receiver as a received combined data stream;
   using a plurality of Walsh decoders to decode the received combined data stream to produce a plurality of possible received data streams, each of the plurality of Walsh decoders performing a Walsh inversion of a different order; and selecting one of the plurality of possible received data streams as a received data stream by selecting a possible received data stream with the least number of errors.

10. The method of claim 9, wherein the step of changing M, comprises:

increasing M when the data backlog crosses the first threshold; and decreasing M when the data backlog crosses a second threshold.

* * * * *